US009889367B2

(12) United States Patent
Minkovitch (10) Patent No.: US 9,889,367 B2
(45) Date of Patent: Feb. 13, 2018

(54) SPORTS MATCH REFEREEING SYSTEM (71) Applicant: Zvi Minkovitch, Modi'in (IL)

(72) Inventor: Zvi Minkovitch, Modi'in (IL)

(*) Notice: Subject to any disclaimer, the term of this patent is extended or adjusted under 35 U.S.C. 154(b) by 0 days.

(21) Appl. No.: 14/777,125

(22) PCT Filed: Jul. 24, 2013

(86) PCT No.: PCT/IB2013/056052
§ 371 (c)(1),
(2) Date: Sep. 15, 2015

(87) PCT Pub. No.: WO2014/147455
PCT Pub. Date: Sep. 25, 2014

(65) Prior Publication Data
US 2016/0045810 A1   Feb. 18, 2016

Related U.S. Application Data (60) Provisional application No. 61/802,966, filed on Mar. 18, 2013.

(51) Int. Cl.
A63B 71/06 (2006.01)
G02B 27/01 (2006.01)
(Continued)

(52) U.S. Cl.
CPC .......... A63B 71/06 (2013.01); A63B 71/0669 (2013.01); G02B 27/017 (2013.01); G02B 27/0172 (2013.01); G02B 27/0179 (2013.01); G06F 3/013 (2013.01); G06F 3/03547 (2013.01); H04N 7/185 (2013.01); H04R 1/028 (2013.01); A63B 71/0605 (2013.01); A63B 2071/068 (2013.01); A63B 2071/0666 (2013.01); A63B 2071/0677 (2013.01); A63B 2102/20 (2015.10); A63B 2102/22 (2015.10); A63B 2225/50 (2013.01); A63B 2243/0025 (2013.01); A63B 2243/0037 (2013.01);
(Continued)

(58) Field of Classification Search
CPC .................................................. A63B 71/0605
See application file for complete search history.

(56) References Cited

U.S. PATENT DOCUMENTS 5,636,920 A   10/1997   Shur et al.
5,898,587 A   4/1999   Bell et al.
(Continued)

FOREIGN PATENT DOCUMENTS

WO   2010030737 A1   3/2010
WO   2013017957 A2   7/2013

OTHER PUBLICATIONS

ISR of PCT Application No. PCT/IB2012/002000 dated Mar. 22, 2013 (2 pages).
(Continued)

Primary Examiner — Dave Czekaj
Assistant Examiner — Berteau Joisil
(74) Attorney, Agent, or Firm — May Patents Ltd. c/o Dorit Shem-Tov (57) ABSTRACT A system for refereeing a sports match including a portable processing device for compiling data associated with the sports match and eyeglasses including data display means for displaying the data associated with the sports match to a wearer of the eyeglasses.

39 Claims, 6 Drawing Sheets (51) Int. Cl.
*G06F 3/01* (2006.01)
*G06F 3/0354* (2013.01)
*H04N 7/18* (2006.01)
*H04R 1/02* (2006.01)
*A63B 102/20* (2015.01)
*A63B 102/22* (2015.01)

(52) U.S. Cl.
CPC . *A63B 2243/0095* (2013.01); *A63B 2244/102* (2013.01); *G02B 2027/014* (2013.01); *G02B 2027/0138* (2013.01); *G02B 2027/0178* (2013.01); *G02B 2027/0187* (2013.01)

(56) References Cited

U.S. PATENT DOCUMENTS

| | | |
|---|---|---|
| 6,122,559 A | 9/2000 | Bohn |
| 7,037,198 B2 | 2/2006 | Hameen-Anttila |
| 6,984,176 B2 | 10/2006 | Bishop |
| 7,277,361 B1 | 10/2007 | Baba |
| 7,289,083 B1 | 10/2007 | Canova |
| 7,479,949 B2 | 1/2009 | Jobs et al. |
| 7,616,098 B2 | 11/2009 | Al-Sabah |
| 7,646,914 B2 | 12/2010 | Clausi et al. |
| 8,235,529 B1* | 8/2012 | Raffle ............. A61B 3/113 351/209 |
| 2003/0027629 A1 | 2/2003 | Pimienta |
| 2008/0172374 A1 | 7/2008 | Wolosin et al. |
| 2009/0131174 A1 | 5/2009 | Hutchinson-Kay et al. |
| 2009/0268483 A1 | 10/2009 | Donahue |
| 2010/0102938 A1 | 4/2010 | Delia et al. |
| 2010/0110368 A1* | 5/2010 | Chaum ............. G02B 27/017 351/158 |
| 2010/0210244 A1 | 8/2010 | Andreasson et al. |
| 2011/0098083 A1 | 4/2011 | Lablans |
| 2011/0218854 A1 | 8/2011 | Shamlian |
| 2012/0050668 A1* | 3/2012 | Howell ............. G02C 11/10 351/158 |
| 2012/0249741 A1* | 10/2012 | Maciocci ............. G06F 3/011 348/46 |
| 2012/0299870 A1 | 11/2012 | Chi et al. |
| 2013/0002724 A1 | 3/2013 | Heinrich et al. |
| 2013/0297403 A1 | 7/2013 | Manning |

OTHER PUBLICATIONS

ISR of corresponding PCT Application No. PCT/IB2013/056052 dated Apr. 9, 2014 (3 pages).
Supplementary European Search Report of corresponding EP application No. 12819249, dated Mar. 19, 2015 (2 pages).
Mihaly Zsiros: "Google Glass for the referees! | Zsiros Mihaly PhD hallgato" Mar. 5, 2013 http://phd.zsirosmihaly.hu/en/google-glass-for-the-referee/.
www.glovers-scorebooks.com/soccer.htm, May 15, 2010.
"I, Referee" mobile app, Dec. 23, 2009.

* cited by examiner

SPORTS MATCH REFEREEING SYSTEM

CROSS-REFERENCE TO RELATED APPLICATIONS

This application claims benefit from U.S. Provisional Patent Application No. 61/802,966, filed Mar. 18, 2013, which is hereby incorporated in its entirety by reference.

FIELD OF THE INVENTION

The present invention relates to sporting events generally and to management of sports matches in particular.

BACKGROUND OF THE INVENTION

Traditionally, a sports referee may use several tools to manage a sports match. For example, in a football (soccer) match, the tools may include a coin to toss deciding the team initially in possession of the ball, red and yellow cards to indicate penalties and warnings, and watches to keep track of the game time and the accumulation of injury time. During the football match the referee may also use a writing instrument and paper to record information such as yellow/red card warnings issued, scored goals by each team and time of score, the identity of a goal scorer, player substitutions, distances on the playing field, and other information. After the football match, the referee has generally manually compiled information about the match so it may be recorded in a report, for example, by national and/or international league officials and/or organizations. Such a compilation process may be time consuming, and may include inaccuracies as the referee attempts to reconstruct the events of the match after the fact.

In addition to the sports referees, many observers of sports matches, for example, journalists, broadcasters, and spectators, often independently record their own observations during a sports match, and then may afterward reconcile their observations with the official record. Sports fans may be eager to keep abreast of a match while it is in progress, without having to wait for a reporter to post his observations.

U.S. Pat. No. 6,122,559 to Bohn describes "a hand held soccer scoring computer for tracking and recording conditions and activities taking place in a soccer match includes a keypad for entering and a display for showing information evolving during the course of the event with regard to player, team, activity and activity location, and the game time associated with the entry. The recorded data may be contemporaneously reviewed and edited and upon completion of the soccer match transferred to a processor printing in desired statistical formats."

SUMMARY OF THE PRESENT INVENTION

There is provided, in accordance with an embodiment of the present invention, a system for refereeing a sports match comprising a portable processing device for compiling data associated with the sports match; and eyeglasses comprising data display means for displaying the data associated with the sports match to a wearer of the eyeglasses.

According to an embodiment of the present invention, the data display means includes a data display screen.

According to an embodiment of the present invention, the data display screen includes a touch screen.

According to an embodiment of the present invention, the eyeglasses include an eye tracking mechanism.

According to an embodiment of the present invention, the eyeglasses include a touch pad.

According to an embodiment of the present invention, the eyeglasses include an imaging unit.

According to an embodiment of the present invention, the imaging unit includes means to zoom into match events.

According to an embodiment of the present invention, the imaging unit includes a range finder.

According to an embodiment of the present invention, the eyeglasses include a focusing viewfinder.

According to an embodiment of the present invention, the eyeglasses include a microphone.

According to an embodiment of the present invention, the eyeglasses include a transceiver for communicating with the processing device.

According to an embodiment of the present invention, the eyeglasses include a sound transducer.

According to an embodiment of the present invention, the data display screen displays the match data real-time.

According to an embodiment of the present invention, the data display screen displays the match data in replay format.

According to an embodiment of the present invention, the system additionally includes a warning display screen.

According to an embodiment of the present invention, the warning display screen includes at least one of a single sided screen and a double sided screen.

According to an embodiment of the present invention, at least one of a single sided and a double sided screen display a red colored background.

According to an embodiment of the present invention, at least one of a single and a double sided screen display a yellow colored background.

According to an embodiment of the present invention, the warning display screen includes means to communicate with at least one of the eyeglasses and the processing device over a wireless communications network.

According to an embodiment of the present invention, at least one of the eyeglasses and the processing device communicate with a data server comprising a communications server and a data storage.

According to an embodiment of the present invention, at least one of the eyeglasses and the processing device includes means to upload match data from the data server.

According to an embodiment of the present invention, at least one of the eyeglasses and the processing device includes means to download match data to the data server.

According to an embodiment of the present invention, the eyeglasses include means to control operation of the data display means.

According to an embodiment of the present invention, the sports match is a football (soccer) match.

According to an embodiment of the present invention, the data display screen includes a plurality of thin vertical lines.

According to an embodiment of the present invention, the plurality of thin vertical lines is equally spaced.

According to an embodiment of the present invention, the data includes identification data associated with a player of the sport match.

There is provided, in accordance with an embodiment of the present invention, A method for refereeing a sports match comprising compiling data associated with the sports match on a portable processing device; and displaying at least a portion of the compiled data on a pair of eyeglasses.

According to an embodiment of the present invention, the method includes transmitting at least a portion of the compiled data to a plurality of glasses.

According to an embodiment of the present invention, transmitting is over a wireless communications network.

According to an embodiment of the present invention, the plurality of glasses is worn by match followers.

According to an embodiment of the present invention, the plurality of glasses is worn by refereeing personnel.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The Applicant, in WO 2013/017957 A2 (PCT Application PCT/IB2012/002000), the disclosure of which is incorporated herein in its entirety by reference, discloses "A system, method and apparatus for managing a football match on a hand held electronic device is presented. The hand held electronic devices includes a first display screen disposed substantially opposite a second display screen. Pre-match information for a first team and a second team are entered into the hand held electronic device. Match related events, such as goals, penalties and substitutions are entered on the hand held electronic device. The device compiles match events and said pre-match information into a match log, and wirelessly transmits the match log to a receiver, such as a match following device".

The Applicant has realized that the Football Match Management System (FB-MM) described in previously mentioned, co-pending PCT application PCT/IB2012/002000, or a similar hand held device suitable for managing one or more sports matches may be integrated with data display glasses as part of a portable refereeing system, hereinafter referred to as FB-RS, which may serve to assist one or more users monitor and/or referee sports matches, and which may include football matches. The smart glasses may include a display screen for displaying information associated with the match (match information or match data) such as, for example, team and player information, match duration and other time-related information, scoring information, and other match monitoring information which may be input to and/or processed by the FB-MM prior to, during, and following the match. The displayed information may include "real-time" data acquired during the match, which may be displayed in "replay" format. The smart glasses may include means for controlling the operation of the glasses, for example, for requesting data to be displayed on the display screen, for inputting data to be displayed on the screen, for activating on-glasses data acquisition means, and for activating on-glasses remote communication means. The control means may include use of voice-activation and eye-movement detection which may allow substantially "hands-free" operation of the FB-RS. Additionally or alternatively, the control means may include use of a touch-screen (on the display screen) or a touch-pad or other touch-activation means on the frame which may be manipulated while the glasses are worn.

Applicants have realized that the use of the FB-RS by referee and other refereeing personnel during a match may be potentially advantageous over the use of existing refereeing tools as match information may be readily displayed on the glasses upon request (verbally or through eye movement or by touching the screen or by touching one of the buttons) while allowing the refereeing personnel to continuously monitor the playing field.

Applicants have further realized that the FB-RS may be form part of a larger match monitoring system wherein part of the match data acquired in the FB-RS system may be shared over a wireless communications network with match followers, including spectators, team fans, journalists, broadcasters, among others. The match followers may view the shared match data through a dedicated application program which may be downloaded to their computing devices which may include personal computers, laptop computers, tablet computers, and mobile phones. The wireless communication network may include, for example a cellular network or a wide area network. Additionally or alternatively, the match followers may also wear smart glasses for viewing the shared match data.

Figure 1:
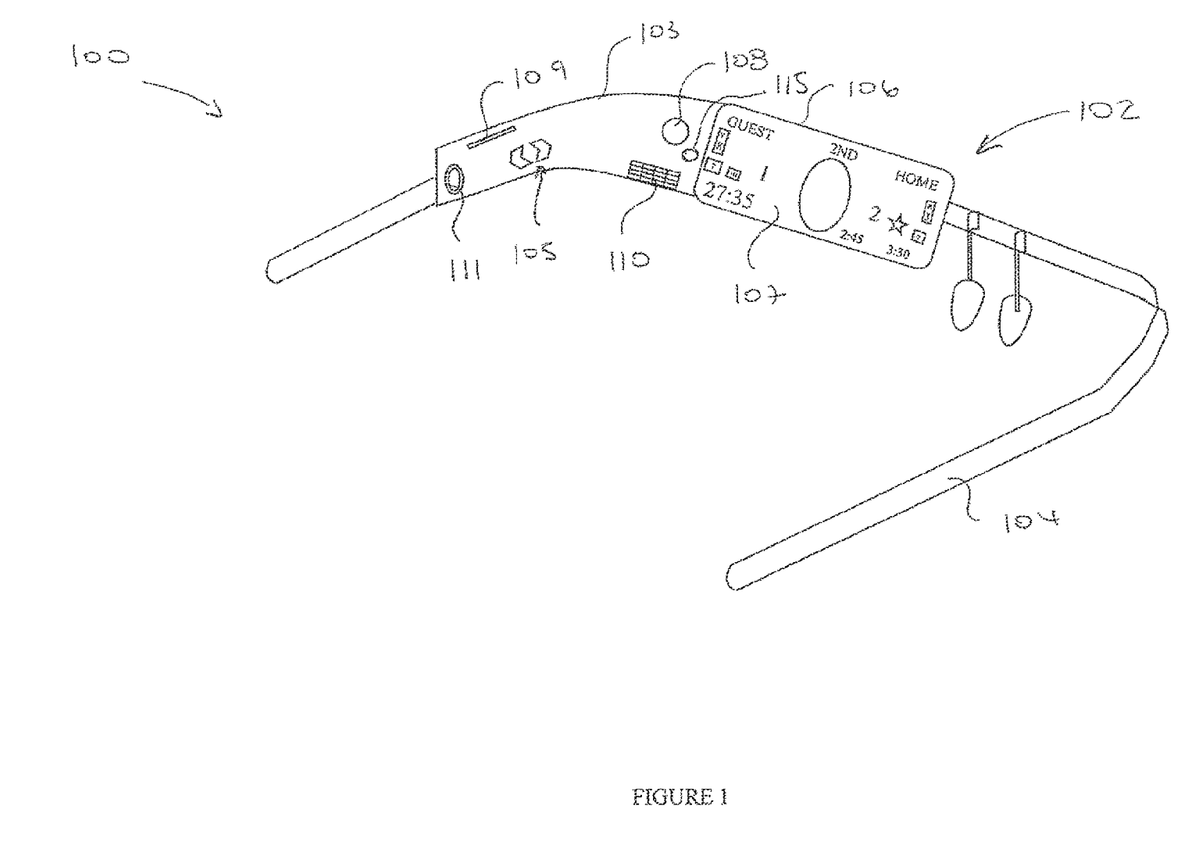
FIG. 1 schematically illustrates an exemplary data display glasses included in a portable FB-RS, according to an embodiment of the present invention.

Reference is now made to FIG. 1 which schematically illustrates an exemplary smart glasses 102 included in a portable FB-RS 100, according to an embodiment of the present invention. For exemplary purposes, FB-RS 100 will be described with reference to use in refereeing football (soccer) matches, although the skilled person may realize that the FB-RS may be used for refereeing substantially any sports match, for example, baseball matches, football matches, basketball matches, hockey matches, volleyball matches, cricket matches, boxing matches, among other type of sports matches. Smart glasses 102 may be worn by an eyeglass user over, or attached to, a pair of eyeglasses (optical glasses, sunglasses, etc.), or may also be worn by a user who does not wear eyeglasses.

Smart glasses 102 may include a frame 104, a touch pad 105, a display 106, an imaging unit 108, a transceiver 109, a microphone 110, and a sound transducer 111 (e.g. loudspeaker, earphone, etc.). Additionally, smart glasses 102 may include a housing 103 attached to frame 104 which may serve to house any one or more display 106, imaging unit 108, transceiver 109, microphone 110, and transducer 111. Smart glasses 102 may be worn by a referee during a football match to assist in monitoring and refereeing the match. Smart glasses 102 may additionally be worn by an assistant referee and/or by linemen to acquire information which may be transmitted to the referee during the match to assist in the refereeing process. The transmitted information may include visual images captured by the assistant referee and/or the linemen, and which may have been out of a line-of-sight and/or a field-of-view of the referee.

Display 106 may include a data display screen 107 for displaying data which may be viewed by the referee and/or other refereeing personnel continuously in the background without interfering with binocular vision. Data display screen 107 may be built into display 106, or alternatively, may be a separate unit which may be placed over the display and may be removable and/or replaceable. Data display screen 107 may be additionally or alternatively worn by the referee and/or refereeing personnel as part of a device which may resemble a wrist watch, or carried elsewhere in the body, for example, as part of a device which may be inserted in a pocket, attached to a belt, and the like. Additionally or alternatively, data display screen 107 may be viewed by the referee and/or the refereeing personnel as a projected image on a surface of a body part such as the hand, or projected on the surface of items, or projected as an image I midair. As an alternative to continuous data display, the data displayed on data display screen 107 may be viewed by the wearer on-demand responsive to verbal instructions issued by the wearer through microphone 110, or responsive to detection of wearer eye movement by an eye tracking mechanism 115 which may be included in housing 103 or on display 106 or elsewhere on frame 104, to wearer touching of the display, or to wearer pressing on touch pad 105, or any combination thereof.

Figure 2:
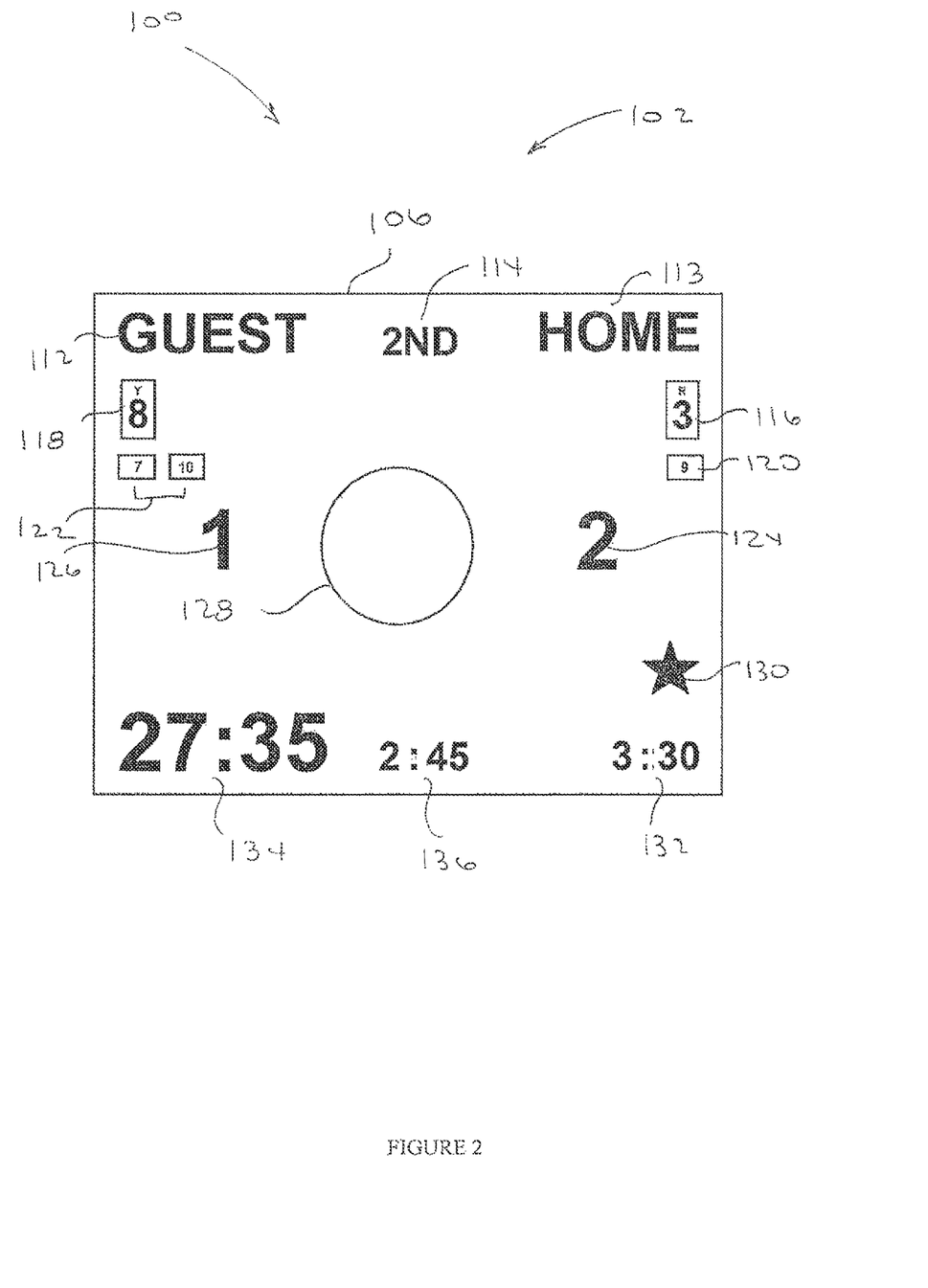
FIG. 2 schematically illustrates an exemplary data display screen in the glasses displaying match data, according to an embodiment of the present invention.

Reference is now also made to FIG. 2 which schematically illustrates data display screen 107 including exemplary match data displayed, according to an embodiment of the present invention. The displayed match data may be in a single color, for example white or black, or may have different colors which may vary according to the type of information displayed. The displayed data may be automatically acquired real-time by the RM-FS, acquired upon request by the wearer, preprogrammed according to predetermined criteria, or any combination thereof. Some of the displayed data may be manually input and/or downloaded to the FB-RS. The exemplary displayed data may include, but not be limited, to the following:

a) name of the guest team, 112;
b) name of the home team, 113;
c) match position ($2^{nd}$ half), 114;
d) penalty card issued to the home team (red card to player no. 3), 116;
e) penalty card issued to the guest team (yellow card to player no. 8), 118;
f) substitution icon for home team (player number 9 was substituted), 120;
g) substitution icon for guest team (players number 7 and 10 were substituted), 122;
h) goal score counter for home team (home team scored 3 goals), 124;
i) goal score counter for guest team (guest team scored 1 goal), 126;
j) viewfinder for imaging unit 108, 128;
k) alert symbol (indicate malfunctions, communication from other refereeing personnel, etc.), 130;
l) accumulated stop time counter, 132;
m) match time counter (duration), 134; and
n) additive time counter, 136.

Imaging unit 108 may include any type of video imaging unit suitable for mounting on housing 103 or elsewhere on frame 104 and for capturing both moving and stationary images during the match, including those of a ball, the players, and of the playing field itself. Imaging unit 108 may allow capturing the moving images which may be displayed on data display screen 107 in real-time and/or in replay format. Imaging unit 108 may include a range finder or other suitable means for measuring distances, for example, for measuring minimum distance between a defending player and the ball during a free kick (e.g. 9.15 m for free kick) or for measuring any other distances as may be required by the referee from time to time during the match. Imaging unit 108 may additionally include zooming capabilities to allow zooming into images in the playing field real-time and/or in replay format. Using the zooming and/or range finding features, imaging unit 108 may allow the referee or refereeing personnel to replay events which may be associated with a player being "off-side", a "hand ball" penalty, a "goal", ball "out of bounds", among many other aspects of a football match's events. Additionally, the zooming and range finding capabilities may allow detection of illegal ball movement during a free kick or a penalty kick and may set off an alarm which may be displayed on data display screen 107. Furthermore, imaging unit 108 may allow capturing images of the match players for comparing to previously stored data for corroborating player identity. Additionally or alternatively, range finding and zooming may be implemented and/or assisted through a focusing viewfinder 128 included in screen 106 which may allow the wearer to zoom in and out of the playing field and to determine distances. Additionally, zooming may include all-field viewing allowing the refereeing personnel to view the whole field from above. Imaging unit 108 may be a separate device externally connected to housing 103 or frame 104, or alternatively, embedded in the housing or the frame.

Figure 3:
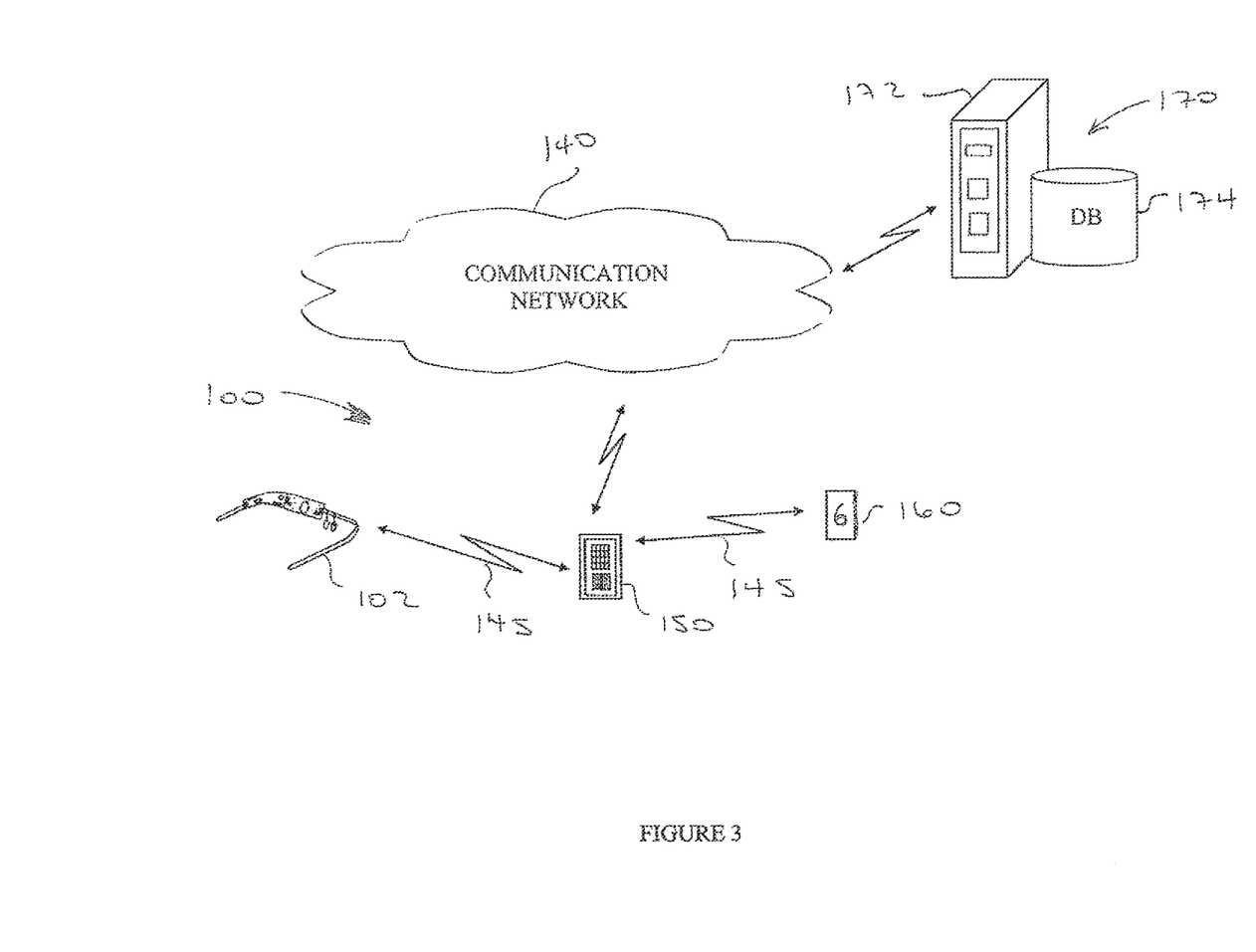
FIG. 3 schematically illustrates a portable FB-RS and its components which include the glasses and an FB-MM, according to an embodiment of the present invention.

Transceiver 109 may serve to communicate smart glasses 102 with other components of FB-RS 100 over wireless means, as described further on in greater detail with reference to FIG. 3. The communication may include receiving through transceiver 109 some of the match data displayed on data display screen 107. Additionally, the communication may include transmitting through transceiver 109 data acquired by means of glasses 102, for example, imaging data acquired by imaging unit 108 or verbally input data through microphone 110, or through touch contacting data display screen 107, or through manually manipulating touch pad 105 or through detection of eye movement in the wearer through eye tracking mechanism 115. Transceiver 109 may also be used for enabling verbal communications among wearers of glasses 102, for example, between the referee and refereeing personnel. Transceiver 109 may be formed as part of housing 103 or frame 104 and may include all suitable transmission and receiving circuitry, including an antenna. Alternatively, transceiver 109 may be attached to housing 103 or frame 104 as a separate component, the antenna forming part of the transceiver or alternatively embedded in housing 103 or frame 104 and to which the transceiver may be connected when attached to the housing or the frame.

Microphone 110 may be used by the wearer to verbally provide instructions to FB-RS 100 regarding system operation and/or operation of glasses 102. For example, the wearer may verbally activate/deactivate data display screen 107, transceiver 109, and/or imaging unit 108. The wearer may verbally instruct FB-RS 100 as to the type of match data to be displayed on data display screen 107, or may provide instructions to make changes in any of the displayed information (or to information to be displayed), for example that shown in FIG. 2. The wearer may additionally verbally enter data to FB-RS 100 through microphone 110, possibly overriding use of other data entry methods which may include use of touch pad 105 or touch data display screen 107. The wearer may additionally provide verbal instructions as to the contents of the data to be received and/or transmitted through transceiver 109, or provide verbal instructions for operating imaging unit 108 including for measuring distances and for zooming operation. Additionally, the wearer may record verbal data through microphone 110, and which may be stored on glasses 102 or elsewhere in FB-RS 100. Additionally, microphone 110 may be used by the referee and/or other refereeing personnel to record remarks associated with match events for inclusion in the report. Microphone 110 may additionally be used facilitate conversations between wearers of glasses 102 (e.g. the referee and refereeing personnel). Microphone 110 may be a separate device externally connected to housing 103 or frame 104, or alternatively, embedded in the housing or the frame.

Sound transducer 111 may allow the wearer to listen to himself/herself when entering data and/or providing verbal instructions through microphone 110. Sound transducer 111 may additionally allow the wearer to listen to verbal communications received, for example, as part of conversations held between the referee and refereeing personnel. Sound transducer 111 may additionally allow the wearer to receive match data which is displayed or being updated on data display screen 107 in audible form, for example through vocalization of the match data content or through a notification signal such as for example a "beep". Sound transducer 111 may be a separate device externally connected to housing 103 or frame 104, or alternatively, embedded in the housing or the frame. As a separate device, sound transducer 111 may be directly attached to housing 103 or frame 104 and may be removable and/or replaceable, or may be attached to the housing or the frame through a wired connection by means of a cable, or through a wireless connection, for example a Bluetooth connection to transceiver 109. Sound transducer 111 may include a miniature loudspeaker, an earphone, a headphone, or any other type of component or mechanism suitable for converting electrical signals to sound which may be heard by the user.

Reference is now made to FIG. 3 which schematically illustrates FB-RS 100 and its components which include glasses 102 and an FB-MM 150, according to an embodiment of the present invention. FB-RS 100 may additionally include a warning display screen 160.

FB-MM 150 may be a computerized control and data collection device and may include some or all of the features and functions included in the Football Match Management System (FB-MM) described in the previously mentioned, co-pending PCT application (published as WO 2013/017957 A2) including the figures therein. FB-MM 150 may be a similar device to the FB-MM but may be configured for use with one or more different types of sports, for example, for baseball, for football (US), for basketball, among other sports. FB-MM 150 may be adapted to transmit data, which may include data stored in the device, data processed by the device, and command data, to glasses 102, some of which may be displayed on data display screen 107. FB-MM 150 may be additionally adapted to receive data from glasses 102, which may include data acquired by the wearer (e.g. imaging data from imaging unit 108) and data, including command data, input by the wearer (e.g. through microphone 110 or by contacting data display screen 107, through eye movement, through manipulating touch pad 105, or any combination thereof). Examples of data which may be stored, transmitted and/or received, and or processed, by FB-MM 150 may include that described in the previously mentioned copending PCT application, suitably adapted according to the type of sport match to be managed and/or refereed.

FB-MM 150 may allow the wearer, for example the referee or other refereeing personnel to input information pertaining to the specific football match to be played, for example, the team names, player names and/or numbers, and the scheduled length of time for the match. The information may be manually input by the user through a keyboard or touch screen on FB-MM 150, or downloaded to the device from external sources, for example, a data server 170. Additionally or alternatively, some or all of the information may be downloaded by the wearer to FB-MM 150 from glasses 102. Some or all of the features described in the copending application and may be carried out using FB-MM 150 may be alternatively initiated from glasses 102. Some examples of these features may include simulating on FB-MM 150 a coin flip to determine which team has initial possession of the ball; signifying the start of the match to start a match clock; monitoring and recording goals, penalties, and player substitutions; recording times when match officials blow a whistle to track the sequence of events during the match. At the conclusion of the match, FB-MM 150 may be used to summarize the events of the match for generating a match report, and may include data acquired through glasses 102. FB-MM 150 may additionally collect data associated with all match events, including all data and commands, including verbal and visual data, including verbal recordings, into a log file which may serve for record purposes and as input to the match log. Additionally or alternatively, the events of the match may be stored in glasses 102 and the data may be downloaded to FB-MM 150 for generating the report. Additionally or alternatively, the events of the match may be stored in data server 170, as described further on below.

Communications between FB-MM 150 and glasses 102 may include use of a wireless medium 145, and may include use of communication technologies such as Wi-Fi, Bluetooth, ZigBee, IR (infrared), laser, among other wireless communication technologies known in the art. Additionally or alternatively, FB-MM 150 and glasses 102 may include a wired connection so that the communication between them is over the wired connection.

FB-MM 150 may be implemented in a relatively small-sized computerized portable device which may be carried by the wearer of glasses 102 inside a pocket or attached to a belt or other clothing accessory. FB-MM 150 may be a dedicated device configured to be exclusively used with FB-RS 100, or may be a computerized portable device such as for example, a smartphone or tablet computer to which an application program may be downloaded and may allow the device to carry out the functions of the FB-MM.

Figure 4:
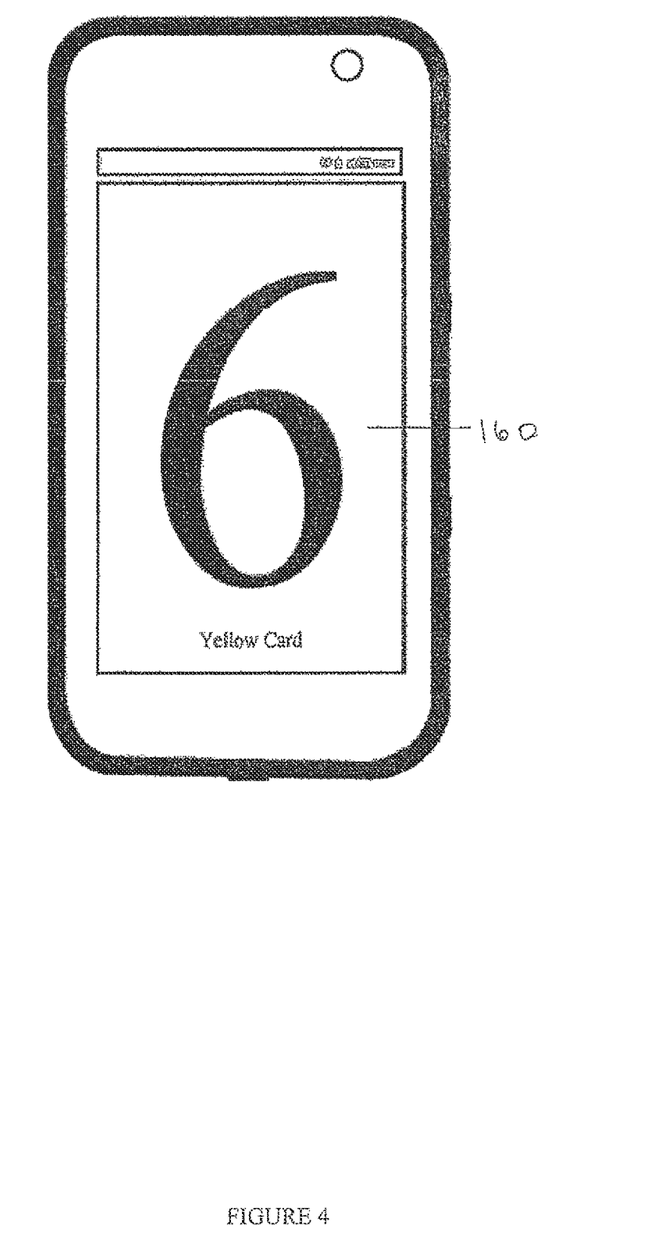
FIG. 4 schematically illustrates an exemplary warning display screen included in the FB-RS, according to an embodiment of the present invention.

Warning display screen 160 may be a single or double sided screen suitable for displaying a yellow background or a red background, functionally designated to play a same role as the yellow and red warning cards issued by the referee as a warning to a player during a match. An exemplary warning display screen 160 is shown in FIG. 4, according to an embodiment of the present invention. Warning screen 160 may additionally display against the colored background a number of a player who is being issued the warning, and may automatically change color from a yellow background to a red background when the same player has been twice issued a yellow background warning. Warning display screen 160 may communicate with FB-MM 150 and/or with glasses 102 over wireless medium 145 using the previously mentioned communication technologies, and the data displayed may be responsive to command data received either from glasses 102 or from FB-MM 150. Warning screen 160 may be of a relatively light weight so that it may be readily raised by the referee to clearly indicate to the match spectators that a player whose number is shown on the screen has been issued a warning. As an alternative to a separate device which acts as warning display screen 160, FB-MM 150 may include features enabling it to act as warning display screen. Such a feature is described in the co-pending previously mentioned PCT application.

Data server 170 may include a communications server 172 and a match data storage module 172. Communications server 172 may serve to transmit to, and/or receive data from, FB-RS 100 over a communications network 140. Communications server 172 may additionally serve to interconnect several FB-RS 100 during a football match, for example to interconnect the referee and refereeing personnel during the match as described further on below with respect to FIG. 5. Communications network 140 may include a mobile phone network, a wide area network (WAN), a local area network (LAN), or other types of suitable networks known in the art, or a combination thereof, and may include the Internet. Communications network 140 may be implemented over wireless means, which may include for example, a wireless WAN, WiMAX, Wi-Fi, a cellular network, a satellite network, among other types of wireless networks known in the art. Additionally or alternatively, communications network 140 may be implemented over wired means, which may include for example, telephone land lines, Ethernet connections, AC power lines, among other types of wired communications networks known in the art.

Data storage 174 may be a dedicated storage for storing information associated with all teams playing in a predetermined football league, and may include a list of all players in each football team and details related to the player. Team player information may include a photograph of the player, a uniform number, among other details. Data storage 174 may include access to Internet websites where team and team player information may be stored, and through which communications server 172 may access the information. Information stored in data storage 174 may be downloaded through communications server 172 to FB-MM 150 and/or to glasses 102 on a real-time basis, on a predetermined basis, or on demand by the wearer.

Data storage 174 may additionally serve as a storage site for uploaded data input to FB-RS 100 and acquired through glasses 102 and/or through FB-MM 150. The data may include real-time match information, or other type of information (e.g. replay-format information) acquired through FB-RS 100 as the match progresses. The information uploaded may include that displayed on data display screen 107 and/or stored in FB-MM 150, and may form part of the data used to generate the match report. The data for the match report may be stored in data storage 174 and downloaded on-demand to FB-MM 150 for generating the match report. Additionally or alternatively, the match report may be generated at data server 170 using the uploaded data. Use of data storage 174 for storing downloaded and uploaded data may be potentially advantageous as memory storage requirements for glasses 102 and FB-MM 150 may be substantially reduced (i.e. most of the data is stored in data storage 174 and may be downloaded/uploaded real-time). Communications server 172 may additionally serve to send parts or the complete match report, which may be stored in data storage 174, to match followers over communications network 140. Alternatively, communications server 172 may send other data stored in data storage 174 and associated with the match to the match followers over communications network 140. This data may include recorded input data acquired through the match, including images, verbal inputs by the referee and refereeing personnel, including conversations.

Figure 5:
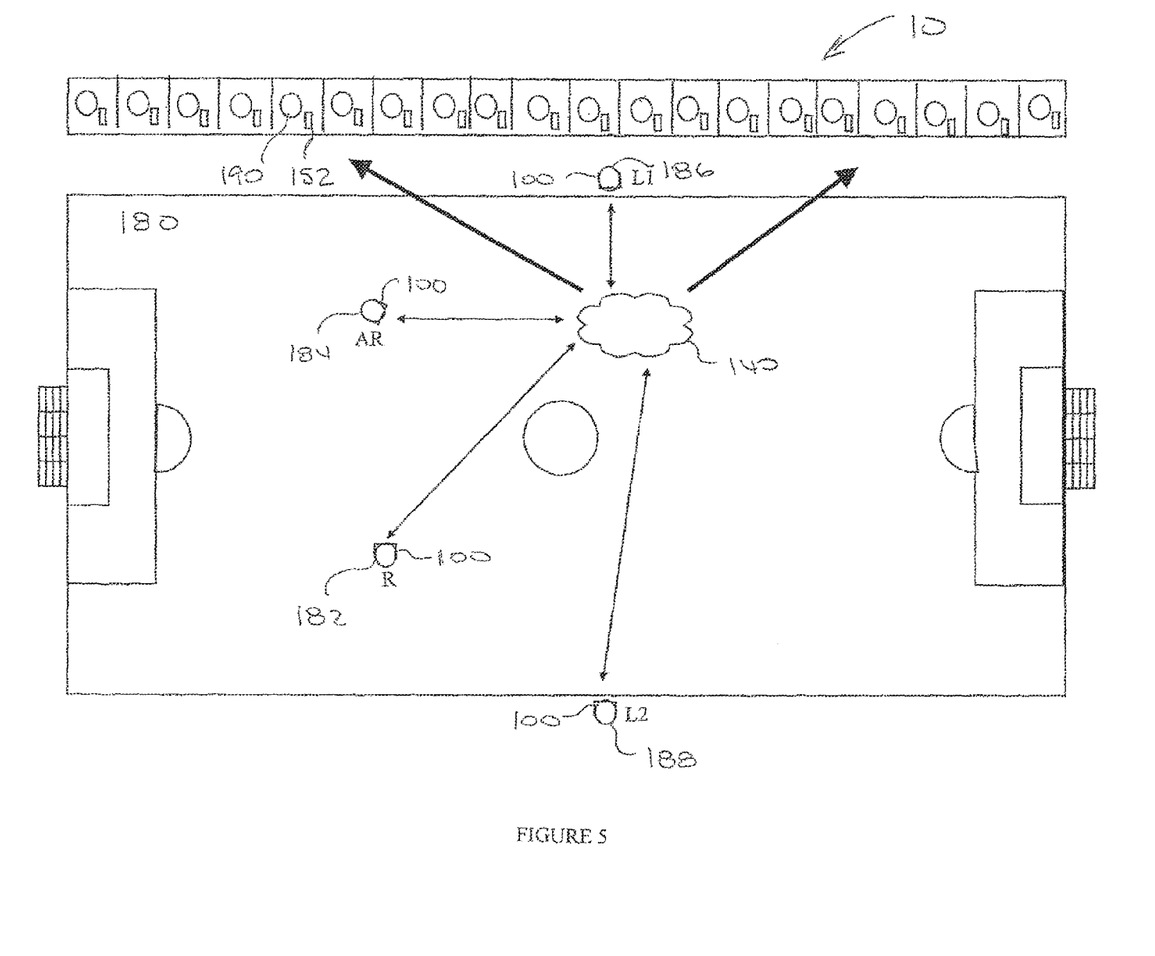
FIG. 5 schematically illustrates an exemplary implementation of an FB-RS for refereeing a football match and as part of a larger match monitoring system, according to an embodiment of the present invention.

Reference is now also made to FIG. 5 which schematically illustrates implementation of FB-RS 100 for refereeing a football match and as part of a larger match monitoring system 10, according to an embodiment of the present invention. The football match is played in a football field 180 and includes as refereeing personnel a referee 182, an assistant referee 184, a first lineman 186, and a second lineman 188. Each of the refereeing personnel is equipped with a FB-RS 100 which includes glasses 102 and a FB-RS 150 Referee 182 may be additionally equipped with a warning display screen 160. Additionally or alternatively, the warning display screen may be implemented in FB-MM 150 of referee 182.

FB-RS 100 of referee 182, assistant referee 184, first lineman 186 and second lineman 188 are interconnected through communications network 140 and may allow the refereeing personnel to verbally communicate with one another, and to share images captured real-time, during the game. For example, referee 182 may communicate with lineman 186/188 to discuss a call by the lineman, or may view through his (the referee's) glasses images acquired by the lineman during the play. Referee 182 may view the images on his glasses in replay-format, or alternatively, the referee may switch channels in his glasses, or through his FB-MM 150, to switch into real-time vision as seen by first lineman 186*a* or any other refereeing personnel through their glasses. The plurality of FB-MM 150 may be interconnected to allow the referee, or possibly the other refereeing personnel, to access information which may be captured real-time, or stored, in the FB-RS 100 of the other refereeing personnel.

Larger match monitoring system 10 may allow match data to be shared with match followers 190 over communications network 140. Match followers 190 may be present in the football stadium during the match, or may be remotely located anywhere in the world, and may be equipped with computing devices 152, for example personal computers, laptop computers, tablet computers, and mobile phones, including a downloaded dedicated application program which allows receiving match data from referee 182 FB-RS 100. Additionally, computing devices 152 may receive match data from other refereeing personnel FB-RS 100. Additionally or alternatively, the match data may be received from data server 170. Additionally or alternatively, match followers 190 may wear a modified version of smart glasses 102 which allows them to receive shared data directly to a receiver on the glasses over communications network 140. This modified version of smart glasses 102 may be potentially advantageous as it may be of a reduced cost for mass merchandising purposes, the reduced cost of the glasses achievable by providing only data reception and display functions on the glasses. The modified version of smart glasses 102 may include commercially available smart glasses known in the art and suitable for displaying the shared match data. An application program may be downloadable to the commercially available smart glasses to allow displaying the shared match data on the glasses. Also downloadable and displayable may be advertising contents and/or other data contents not limited to the shared match data. The match data received may include the match report, and may be received on a real-time basis during match progress. Alternatively, the match data may be received not real-time, and may include receiving the data only after the match has finalized. The match data received may be selective data and may vary according to a type of match follower 190. For example, journalists, broadcasters, and sports writers may receive match data which may include details not provided to spectators.

Figure 6:
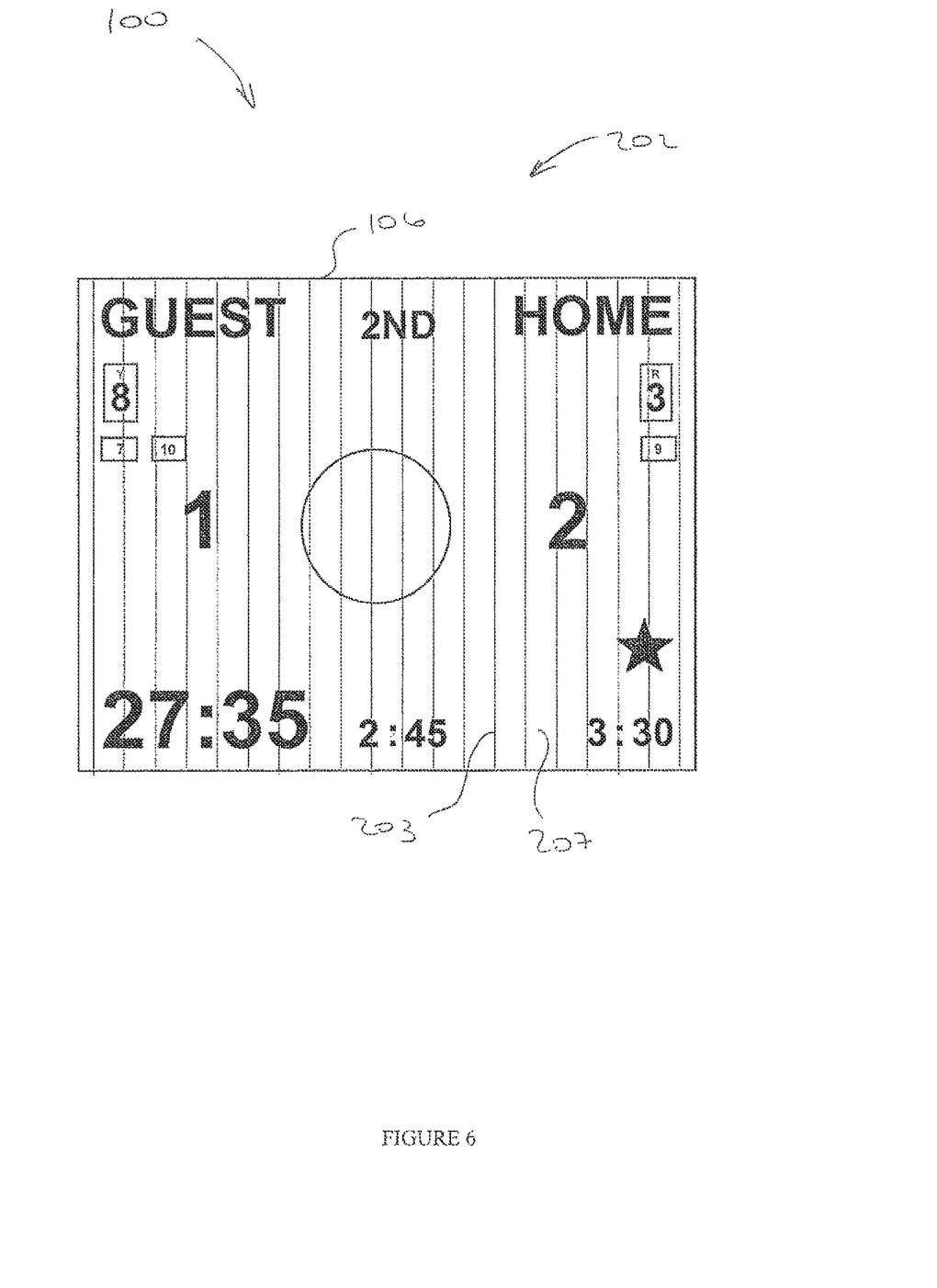
FIG. 6 schematically illustrates an exemplary data display screen in linesman smart glasses, according to an embodiment of the present invention.

Reference is now made to FIG. 6 which schematically illustrates an exemplary data display screen 207 in linesman smart glasses 202, according to an embodiment of the present invention. Linesman smart glasses 202 may be functionally similar to smart glasses 102 modified to allow a soccer game linesman to monitor and determine when an offensive game player is in an "offside" situation.

Data display screen 207 may be included in display 106 and may include a plurality of thin vertical lines 203 which may be used by the linesman to identify the position of players relative to one another. Lines 203 may be equally spaced and may represent a whole length of the playing field, or a section of the playing field. Lines 203 may allow glass 202 automatic detection of "offside" conditions where one or more offensive game players may be positioned in the playing field between a last defensive player and the goalkeeper. Additionally or alternatively, the detection may be visually performed by the linesman. Smart glasses 202 may be configured to emit a warning signal to the linesman of a detected offside condition and correspondingly an "offside" violation. The warning signal may be a visual signal displayed on data display screen 207. Additionally or alternatively, the warning signal may be an audio signal emitted through sound transducer 111. Glasses 202 may allow identification of the offensive play that has committed an offside violation, and may allow zooming into the playing area of the offensive player. Additionally, glasses 202 may allow automatic transmission of details associated with the offside violation to glasses 102 worn by the referee.

Unless specifically stated otherwise, as apparent from the preceding discussions, it is appreciated that, throughout the specification, discussions utilizing terms such as "processing," "computing," "calculating," "determining," or the like, refer to the action and/or processes of a computer, computing system, or similar electronic computing device that manipulates and/or transforms data represented as physical, such as electronic, quantities within the computing system's registers and/or memories into other data similarly represented as physical quantities within the computing system's memories, registers or other such information storage, transmission or display devices.

Embodiments of the present invention may include apparatus for performing the operations herein. This apparatus may be specially constructed for the desired purposes, or it may include a general-purpose computer selectively activated or reconfigured by a computer program stored in the computer. Such a computer program may be stored in a computer readable storage medium, such as, but not limited to, any type of disk, including floppy disks, optical disks, magnetic-optical disks, read-only memories (ROMs), compact disc read-only memories (CD-ROMs), random access memories (RAMs), electrically programmable read-only memories (EPROMs), electrically erasable and programmable read only memories (EEPROMs), magnetic or optical cards, Flash memory, or any other type of media suitable for storing electronic instructions and capable of being coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein.)

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A device for interaction with a person for monitoring or managing an event, the device comprising:
   a tactile surface responsive to the person touch or press;
   a first camera for capturing or imaging a visual image;
   a microphone configured and mounted for capturing the person originated voice;
   a second camera configured and mounted for capturing or imaging the person eye or eyes;
   a first display configured and mounted for providing first visual data to the person;
   a sound transducer consisting of, or comprising, a loudspeaker, headphone, or earphone, that is configured and mounted for providing auditory data to the person;
   a range finder for measuring a distance coupled to the first display for displaying the measured distance;
   an antenna and a wireless transceiver coupled the antenna for wirelessly receiving first data and for wirelessly transmitting second data, the wireless transceiver is coupled to the first display and to the sound transducer, respectively for the first visual data and the auditory data to be responsive to, include, or to be is based on the first data, and the wireless transceiver is coupled to the tactile surface, the first camera, the microphone, and the second camera for the second data that is respectively responsive to, include, or is based on the person touch or press, the visual image, the person originated voice, and the person eye or eyes;
   a software and a processor for executing the software, the processor coupled to control, receive data from, or transmit data to, the tactile surface, the first and second cameras, the microphone, the first display, and the sound transducer; and
   a wearable eyewear frame configured for mounting or attaching thereon the processor, the antenna, the tactile surface, the first and second cameras, the microphone, and the first display.

2. The device according to claim 1, wherein the wireless transceiver consists of, or comprises, a modem (modulator/ demodulator) using RF (Radio-Frequency) based Wireless Local Area Network (WLAN), Wireless Personal Area Network (WPAN), or Wireless Wide Area Network (WWAN), and wherein the device is configured to, and shaped as, an eyewear device.

3. The device according to claim 2, wherein the WLAN is according to, or based on, Wi-Fi standard, wherein the WPAN is according to, or based on, Bluetooth or ZigBee standard, wherein the WWAN is based on cellular or satellite communication, and wherein the device is addressable in the wireless network, and wherein the device is configured to, and shaped for, attach to an optical eye-glasses or sunglasses.

4. The device according to claim 1, wherein the wireless communication is according to, is based on, or is using, a Wireless Personal Area Network (WPAN), the antenna is a WPAN antenna, and the wireless transceiver is a WPAN transceiver.

5. The device according to claim 4, wherein the WPAN is Bluetooth®, and wherein the range finder is integrated with the first camera.

6. The device according to claim 1, wherein the first visual data on the first display is responsive to the person eye movement captured by the second camera, to the person voice sensed by the microphone, or to the person touch or press sensed by the tactile surface, and the device further comprising a memory coupled to the processor and to the first camera for storing a first image, and the device further operative to compare the first image with the visual image captured by the first camera.

7. The device according to claim 6, wherein the first image comprises a first human image and the visual image comprises a second human image, and the first and second human images are compared for determining to include the same person.

8. The device according to claim 1, further comprising a memory coupled to the processor and to the microphone for storing the person originated voice, and wherein the sound transducer is coupled to the memory for playing the stored person originated voice, and wherein the first or second data is responsive to the person eye movement captured by the second camera, to the person voice sensed by the microphone, or to the person touch or press sensed by the tactile surface.

9. The device according to claim 1, wherein the auditory data to the person is responsive to the person eye movement captured by the second camera, to the person voice sensed by the microphone, or to the person touch or press sensed by the tactile surface.

10. The device according to claim 1, for use with a data server comprising a storage for storing data, wherein the device is operative to communicate with the data server over a communication network via the antenna and the wireless transceiver, and the device is operative to receive the first data from the data server over the communication network, and to transmit the second data to the data server over the communication network, and wherein the event is a sport match, the person is a referee in the sport match, and the device is configured for supporting the managing, monitoring, and refereeing of the sport match.

11. The device according to claim 10, wherein the communication network is a Wireless Wide Area Network (WWAN) that consists of, comprises, or uses, WiMAX, cellular network, or a satellite network; or a Wireless Local Area Network (WLAN), and the antenna is respectively a WWAN or WLAN antenna, and the wireless transceiver is respectively WWAN or WLAN wireless transceiver, and wherein the sport match is a baseball match, football match, soccer match, basketball match, hockey match, volleyball match, cricket match, or boxing match.

12. The device according to claim 1, further comprising a memory, wherein the first camera is a video camera for capturing video data, and the memory is coupled to the first camera for storing the video data, and the first display is coupled to the memory for displaying the video data, and wherein the sound transducer is coupled to the wireless transceiver and to the processor, and the device is operative to vocalize at least part of the first data.

13. The device according to claim 1, wherein the first visual data, the first data, or the second data, consists of, is responsive to, or is based on, an input from the person or according to a predetermined criterion.

14. The device according to claim 1, wherein the first visual data, consists of, is responsive to, or is based on, the first data or the image captured by the first camera.

15. The device according to claim 14, wherein the event is a sport event that is a match between first and second teams, each of the teams is associated with a team name, team players, and a team coach, and the match is managed by a referee team headed by a primary referee, and wherein the first visual data, the first data, or the second data, comprises pre-sport event information known before the sport event initiation, and sport event occurrences occurring during the sport event duration.

16. The device according to claim 15, wherein the pre-sport event information comprising at least two items out of a group of items consisting of the sport field identification, the sport field location, the match date, the scheduled game duration, the first team name, the second team name, the first team players names, the second team players names, the first team coach name, the second team coach name, the primary referee name, and the referee team members names.

17. The device according to claim 16, wherein sport event occurrences comprising the occurrences, or the time of the occurrences during the match, of least two items out of a group of items consisting of: a flip coin result, a flip coin win team name, an actual start time of the match, an actual game duration, a time addition to the planned game duration, a goal score, a number of yellow card warnings of the first team, a number of yellow card warnings of the second team, a number of yellow card warnings of each player of the teams, a goal score, a number of red cards of the first team, a number of red cards of the second team, a red card of each player of the teams, a penalty, a player substitution, a penalty kick, and a distance measurement.

18. The device according to claim 14, wherein the first visual data further comprises substantially equally spaced vertical lines for improved detecting by the person the relative distance between objects.

19. The device according to claim 18, wherein the objects are human players in a soccer match, and wherein the vertical lines are used for detecting an 'offside' occurrence.

20. The device according to claim 1, further comprising a second display configured for providing second visual data, the second display is mounted on the wearable eyewear frame.

21. The device according to claim 20, wherein the second display is mounted on the wearable eyewear frame so that the screen image is not interfering with the person binocular vision when wearing the device.

22. The device according to claim 20, wherein the second display is enclosed in a single enclosure distinct from the wearable eyewear frame, and wherein the single enclosure is attachable, movable, or replaceable, with the wearable eyewear frame.

23. The device according to claim 20, wherein the second display is configured to project the second visual data on a surface that is a human skin or the person hand.

24. The device according to claim 20, wherein the second visual data on the second display is responsive to the person eye movement captured by the second camera, to the person voice sensed by the microphone, or to the person touch or press sensed by the tactile surface.

25. A system comprising first and second devices each according to claim 1, wherein the first device operative to transmit the visual image captured by the camera of the first device via the wireless transceiver of the first device, and the second device operative to receive the visual image via the wireless transceiver of the second device and to display the received visual image on the first display of the second device.

26. The system according to claim 25, wherein the event is a sport match, and the first and second devices are further configured for use by first and second referees for managing or monitoring the sport match.

27. A system comprising first and second devices each according to claim 1, wherein the first device operative to transmit the person originated voice captured by the microphone of the first device via the wireless transceiver of the first device, and the second device operative to receive the person originated voice via the wireless transceiver of the second device and to play the received person originated voice by the sound transducer of the second device.

28. The system according to claim 27, wherein the event is a sport match, and the first and second devices are further configured for use by first and second referees for managing or monitoring the sport match.

29. A system for interaction with the person for monitoring or managing the event comprising a first device according to claim 1 and a second device, the second device comprising:
    a software and a processor for executing the software, the software including an operating system;
    a memory storing the software coupled to the processor;
    an input component, consisting of or comprising a keyboard or a tactile surface coupled to the processor for capturing input from a person;
    a display coupled to the processor for presenting visual information to the person;
    an antenna and a wireless transceiver coupled to the processor for wirelessly communicating with the first device; and
    a hand held enclosure for housing the processor, the memory, the input component, the wireless transmitter, and the display,
    wherein the second device is operative to receive the first data from the person using the input component, to store the first data in the memory, to display the first data on the display, and to transmit the first data via the wireless transceiver to the first device, and wherein the second device is operative to wirelessly receive the second data from the first device, to store the first data in the memory, to display the first data on the display.

30. The system according to claim 29, wherein the first device or the second device is further operative to store in the memory the first data or the second data, and wherein the second device consists of, or is part of, a smartphone or a tablet.

31. The system according to claim 29, wherein the second device further comprising a distance measuring meter coupled to the processor for measuring a distance and displaying the measured distance on the display, wherein the distance measuring meter is based on light, laser, sound, ultrasonic sound, or optics.

32. The system according to claim 29, further comprising a random number generator coupled to, or part of, the processor, for generating a random number.

33. The system according to claim 29, further comprising a third device, the third device comprising:
    a software and a processor for executing the software, the software including an operating system;
    a display screen coupled to the processor for presenting visual information to a person;
    an antenna and a wireless transceiver coupled to the processor for wirelessly communicating with the second device; and
    a hand held enclosure for housing the processor, the wireless transmitter, and the display screen,
    wherein the third device is operative to wirelessly receive via the third device wireless transceiver a third data from the second device, and to display the third data on the display screen.

34. The system according to claim 33, wherein the third device is further operative to display yellow or red background color on the display screen in response to the third data, and wherein the third device further comprising a second display screen coupled to the processor, wherein the third device enclosure comprises two opposed first and second exterior surfaces, and wherein the first display screen is attached to the first exterior surface and the second display is attached to the second exterior surface.

35. A system comprising a plurality of three or more devices, each according to claim 1, the devices communicating with each other over a communication network via the respective antennas and wireless transceivers, where the second data of one of the plurality of devices is received as the first data by all other devices of the plurality of devices.

36. The system according to claim 35, wherein the communication network is a Wireless Wide Area Network (WWAN) or a Wireless Local Area Network (WLAN), and each of the antennas is respectively a WWAN or WLAN antenna, and each of the wireless transceivers is respectively WWAN or WLAN wireless transceiver.

37. The system according to claim 35, further comprising a unit communicating with the plurality of devices over the communication network, the unit operative to receive and display the second data from the one of the plurality of devices, and wherein the unit is a personal computer, laptop computer, tablet computer, or a mobile phone.

38. The device according to claim 1, wherein the device is configured to, and shaped as, an eyewear device.

39. The device according to claim 1, wherein the sound transducer is coupled to the wireless transceiver and to the processor, and the device is operative to vocalize at least part of the first data.

* * * * *